(12) United States Patent
Nakayama et al.

(10) Patent No.: US 7,609,665 B2
(45) Date of Patent: Oct. 27, 2009

(54) WIRELESS REPEATER, THE METHOD FOR WIRELESS REPEATING, AND DATA COMMUNICATIONS SYSTEM

(75) Inventors: Koichiro Nakayama, Yokohama (JP); Hiroki Tamura, Yokohama (JP); Shinji Takao, Yokohama (JP); Koji Matsunaga, Yokohama (JP); Kenichi Ishikawa, Yokohama (JP); Kanna Okamura, Yokohama (JP); Junichi Sawada, Kawasaki (JP); Hidetoshi Amari, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 436 days.

(21) Appl. No.: 11/101,463

(22) Filed: Apr. 8, 2005

(65) Prior Publication Data

US 2006/0067363 A1   Mar. 30, 2006

(30) Foreign Application Priority Data

Sep. 30, 2004  (JP)  ............................. 2004-287737

(51) Int. Cl.
*H04B 7/185*  (2006.01)
*H04B 7/15*  (2006.01)
*H04J 3/16*  (2006.01)
*H04J 3/22*  (2006.01)

(52) U.S. Cl. ..................... 370/316; 370/468; 370/544; 455/11.1

(58) Field of Classification Search .................. 370/310, 370/315–327, 328, 329, 338, 340, 341, 395.21, 370/403, 404, 405, 431, 437, 464, 465, 468, 370/477, 492, 419, 420, 463, 501, 542, 543, 370/544
See application file for complete search history.

(56) References Cited

U.S. PATENT DOCUMENTS

| 5,065,396 | A  | * | 11/1991 | Castellano et al. | .......... 370/536 |
|---|---|---|---|---|---|
| 6,370,384 | B1 | * | 4/2002 | Komara | ...................... 455/447 |
| 6,584,080 | B1 | * | 6/2003 | Ganz et al. | .................. 370/315 |
| 2002/0067525 | A1 | * | 6/2002 | Sakamoto et al. | ........... 359/124 |
| 2004/0213395 | A1 | * | 10/2004 | Ishii et al. | .............. 379/201.01 |
| 2004/0266429 | A1 | * | 12/2004 | Hui et al. | ..................... 455/434 |
| 2005/0176452 | A1 | * | 8/2005 | Perlman | ...................... 455/500 |
| 2006/0146764 | A1 | * | 7/2006 | Takemoto et al. | ........... 370/338 |

FOREIGN PATENT DOCUMENTS

| JP | 2002-10331 | 1/2002 |
|---|---|---|
| JP | 2002-10332 | 1/2002 |
| JP | 2002-84221 | 3/2002 |
| JP | 2003-218756 | 7/2003 |
| JP | 2004-248289 | 9/2004 |

\* cited by examiner

*Primary Examiner*—Seema S Rao
*Assistant Examiner*—Christine Duong
(74) *Attorney, Agent, or Firm*—Staas & Halsey LLP (57) ABSTRACT

A wireless repeater on a communication line has a structure that includes a plurality of wireless communication media, and a band control unit that changes the first bandwidth of the communications line according to increase and decrease in the number of wireless communication media by an operation dividing the first bandwidth of the communications line into a plurality of second bandwidths and an operation multiplexing a plurality of second bandwidths adjusting to the first bandwidth, responding to the number of the wireless communication media.

10 Claims, 11 Drawing Sheets

WIRELESS REPEATER, THE METHOD FOR WIRELESS REPEATING, AND DATA COMMUNICATIONS SYSTEM

BACKGROUND OF THE INVENTION

1. Field of the Invention

The present invention relates to a wireless repeater, the method for wireless repeating and data communications system, and more particularly to the effective and operative technology such as wireless repeating technology and data communication technology, which utilize microwaves as communication medium.

2. Description of Related Art

In establishing a microwave transmission network in a wide area such as between large cities, for example, there are some cases that securing the high-capacity microwave line in every laying path of the network is not easy. Also, in establishing new microwave lines to connect the existing high-capacity communication paths, there are some cases that the establishment of a high-capacity microwave line adapting the maximum capacity of the existing network from the very beginning is undesirable, regarding the balance between band demands and setting cost.

Therefore, in establishing the microwave line that connects the existing high-capacity communication paths, it is possible to establish communication by dividing the line into a plurality of microwave line with relatively low capacity. That is, in the repeaters at both terminals of the line, one repeater splits the packet coming from a high-capacity communication line into the number of microwave lines between the repeaters, and distributes and transmits them to wireless devices that send and receive microwaves. Another repeater in the other terminal assembles the above-mentioned packets received by a plurality of wireless devices, and performs the processing to transmit the assembled packets to a high-capacity communication line. In this case, when one of the wireless devices is disconnected due to trouble, or when a wireless device is added on, it requires the change in the settings of the repeaters by operators. That is, when one of the wireless devices fails or when wireless device is added on, unless the number of wireless device set in the repeaters at both terminals of the line is changed, distribution number doesn't correspond to the number of receiving wireless device, and packets cannot be distributed properly. Therefore, every time the number of the wireless devices is changed, operators needed to change the setting manually.

For that reason, the automatic system that detects the changes in the number of wireless devices and adjusts the distribution number without operator intervention had been in demand.

Also, without operator intervention, the band cannot be increased or decreased, and then it lowers the flexibility in operation.

For example, presently, SONET/SDH is the major backbone of wide area network, which is way up on the high level of LAN. However, RPR (Resilient Packet Ring) is now drawing public attention as new backbone alternative to the SONET/SDH. This RPR is a new transmission technology that places an emphasis on trouble recovery functions.

To establish a part of ring topology of RPR with above-mentioned microwave line, if operator intervention is needed for maintenance of microwave line described above, the quick trouble recovery function (trouble recovery with in 50 ms, for example) that is a selling point of RPR cannot be realized.

The following patent literature 1 discloses the technology that, in the digital mobile communication system with a structure of connecting between base stations of cellular phones through multiplex transmission, reallocates lines that are allocated to each of the datum, according to the balance of the load size of audio data and non-audio data. However, the above-stated technical issue accompanied by changes in allocation following the increase or the decrease of communication line itself is not mentioned.

Patent Literature 1:

Japanese Published Unexamined Application No. 2002-10331

SUMMARY OF THE INVENTION

It is an object of the present invention to provide wireless repeating technology that enables prompt distribution control over band following the changes in wireless communication media that comprises wireless line without the operator intervention.

It is another object of the present invention to provide wireless repeating technology whose degree of freedom of the operation can be improved by flexible changes of band in changing the number of the wireless communication media that comprises the wireless line.

It is the first aspect of the present invention to provide a wireless repeater that lies on a communication line, and that includes a plurality of the wireless communication media, and band control unit that changes first bandwidth of the above-mentioned communication line according to the change in the number of the above-mentioned wireless communication media by conducting the operation of dividing the first bandwidth of the above-mentioned communication line into a plurality of second bandwidth following the number of the above-mentioned wireless communication media and the operation of multiplexing the above-mentioned plurality of second bandwidth to make the first bandwidth.

It is the second aspect of the present invention to provide the method of wireless repeating that increases and decreases the above-mentioned first bandwidth of the above-mentioned communication line in changing the number of the above-mentioned wireless communication lines by the operation of dividing the first bandwidth of the communication line to every second bandwidth of a plurality of wireless communication line and the operation of multiplexing a plurality of the above-mentioned second bandwidth to adjust to the above-mentioned first bandwidth.

It is the third aspect of the present invention to provide a data communication system that is comprised of a plurality of data relay devices lying on the communication line that consist of ring topology transmission route, which controls the sending and receiving of the data between the above-mentioned communication line and the network lying under the above-mentioned communication line, and wireless repeaters lying between the above-mentioned data relay devices. And the above-mentioned wireless repeaters include a plurality of wireless communication media that consist of a part of the above-mentioned communication line and band control unit that changes the above-mentioned first bandwidth of the above-mentioned communication line according to the increase and the decrease in the number of the above-mentioned wireless communication media by the operation of dividing the above-mentioned first bandwidth into a plurality of second bandwidth according to the number of the above-mentioned wireless communication media and by the operation of multiplexing a plurality of the second bandwidth mentioned above adjusting to the above-mentioned first bandwidth.

DESCRIPTION OF THE PREFERRED EMBODIMENT

Figure 1:
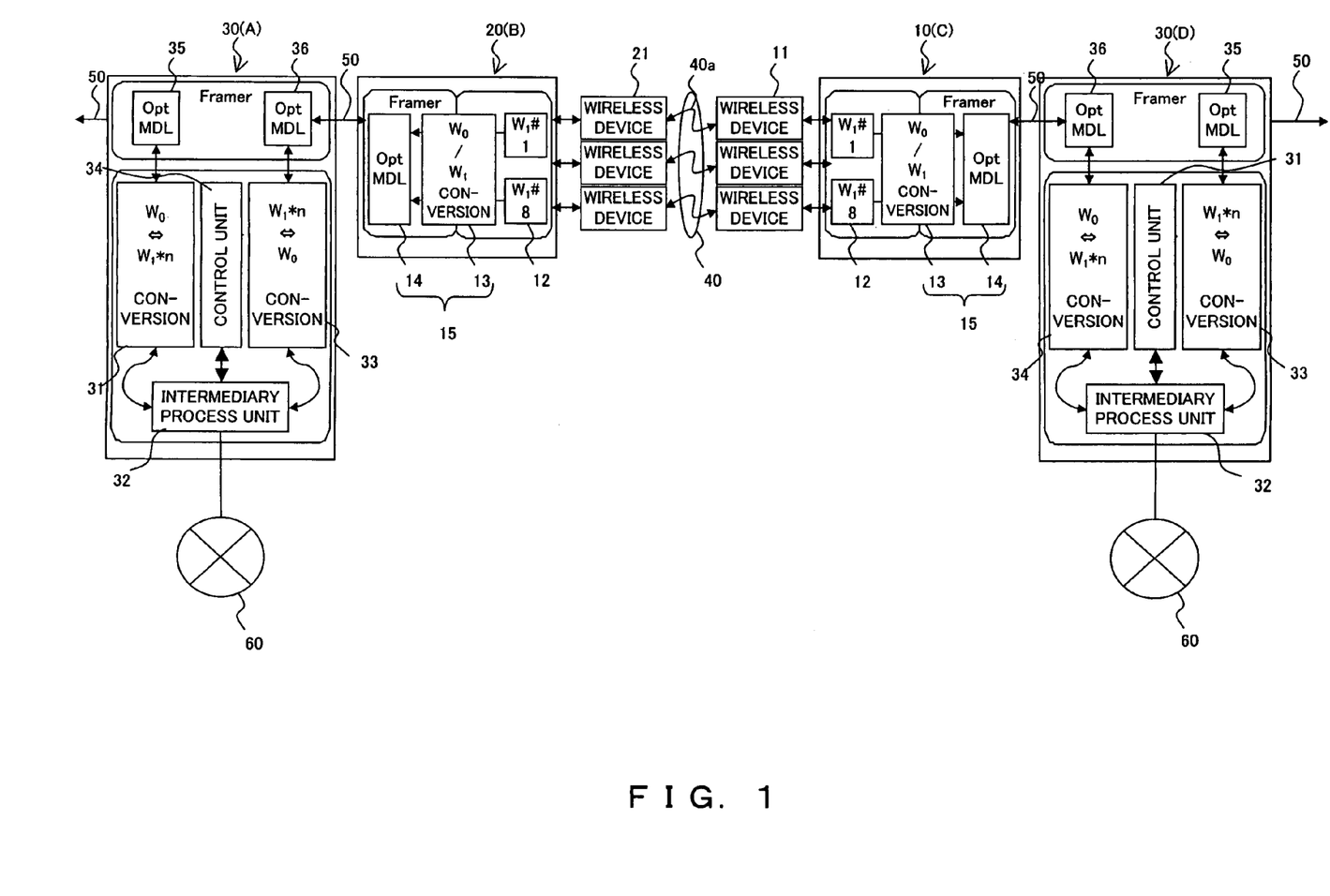
FIG. 1 is a block chart indicating a sample of a configuration of wireless repeater as an embodiment of the present invention.
Figure 2:
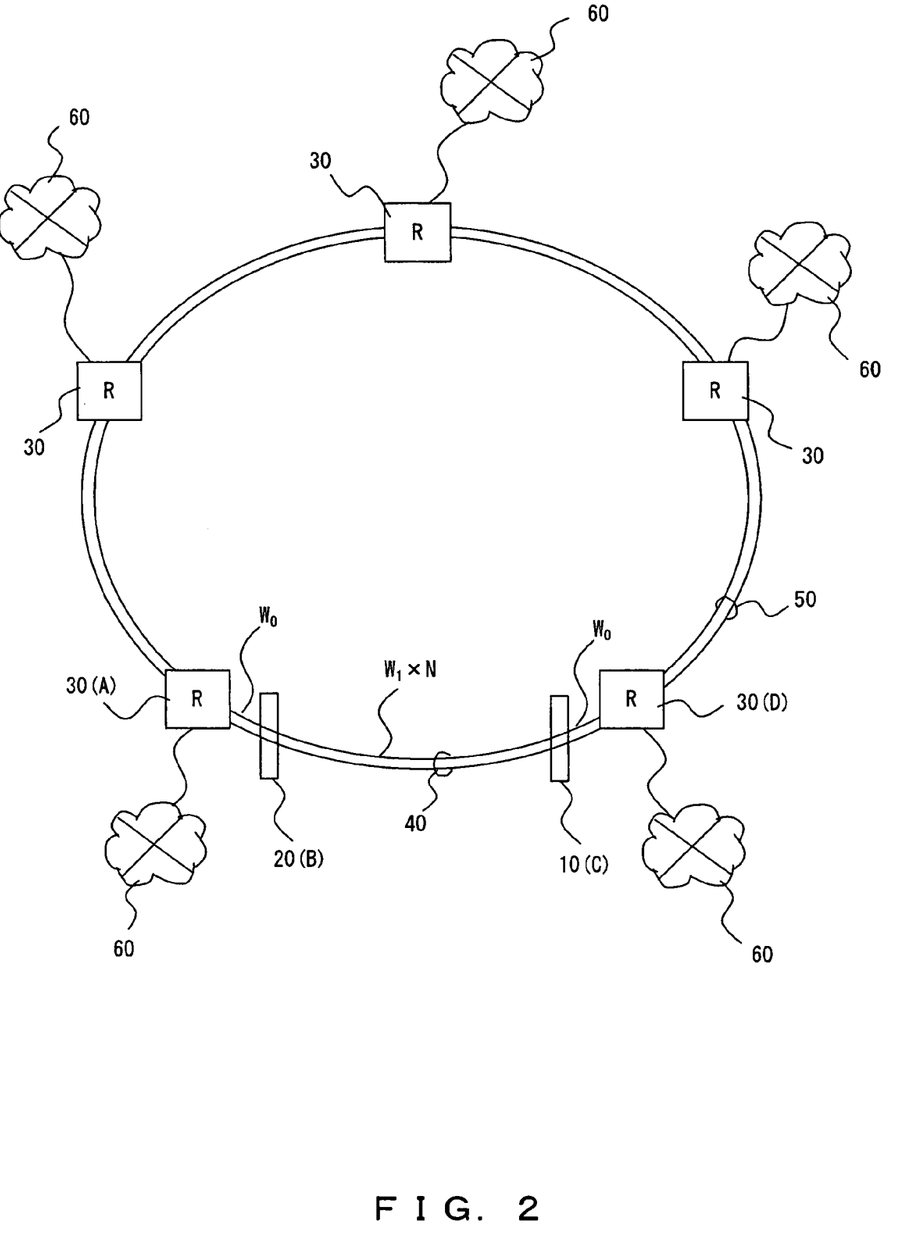
FIG. 2 is a schematic diagram describing a sample of architecture of data communication system that comprises wireless repeater as an embodiment of the present invention.
Figure 3:
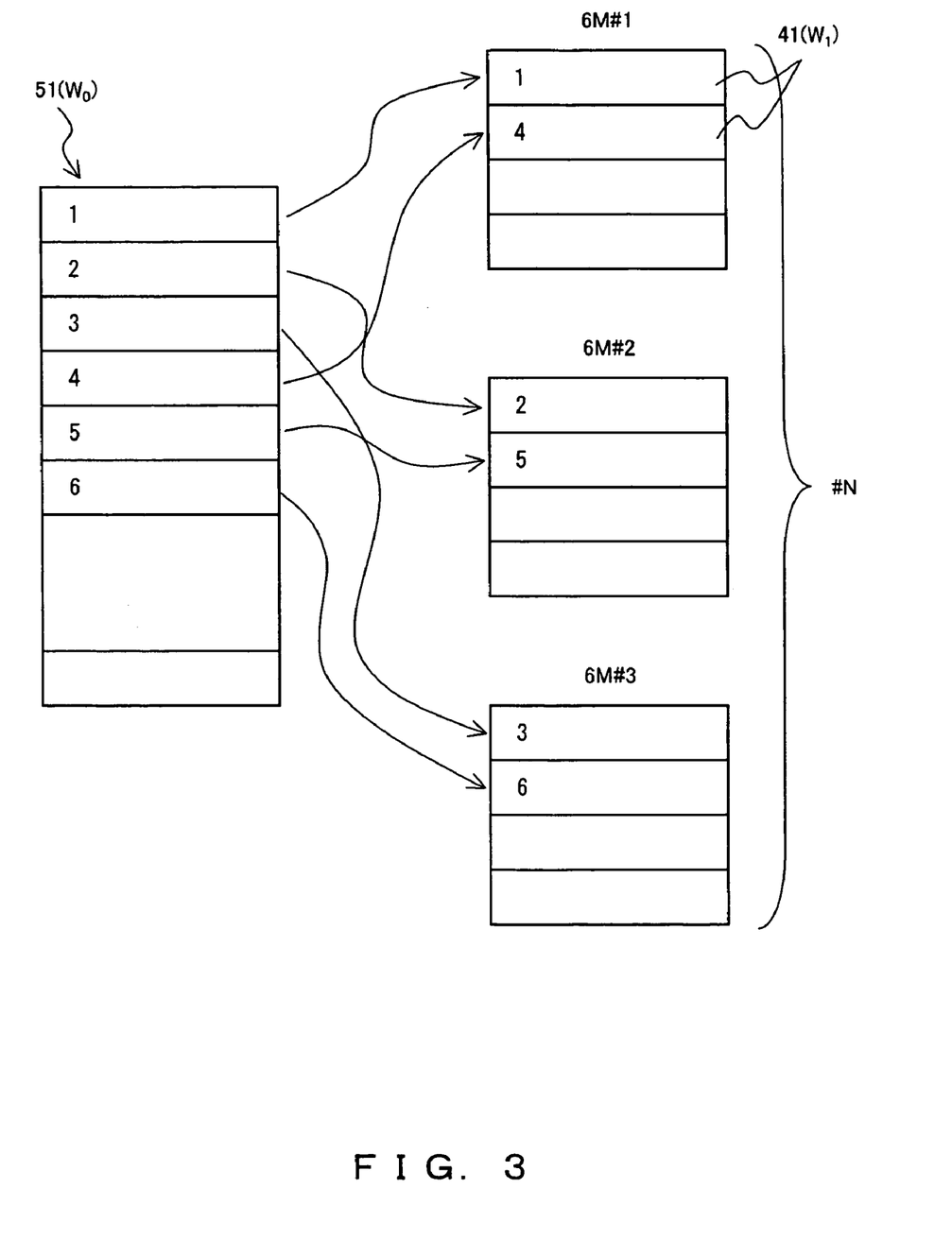
FIG. 3 is a schematic diagram describing a sample of the operation of the repeater as an embodiment of the present invention.

The present invention will be more apparent from the following detailed description in conjunction with the accompanying drawings, in which:

FIG. 1 is a block diagram indicating an example of a configuration of a wireless repeater that is an embodiment of the present invention, FIG. 2 is a schematic diagram describing an example of architecture of information communication system that comprises a wireless repeater that is an embodiment of the present invention, and FIG. 3 is a schematic diagram describing an example of the operation of the repeater that is an embodiment of the present invention.

As FIG. 2 exemplifies, data communication system of the present embodiment, as an example, consists of backbone 50 with ring topology and a plurality of backbone repeaters 30 (data relay device) lying on the channels of this backbone 50. Under the individual backbone repeater 30, local area network 60 is connected and the backbone repeater 30 controls the data communication through backbone 50 among a plurality of local area networks.

Backbone 50, for example, consists of wide area communication web comprised RPR, and is comprised of communication media such as high-capacity microwave line and optical fibers. That is, FIG. 1 is so simple that backbone 50 is drawn as one line, however, backbone 50 actually comprises clockwise and counter clockwise multiplexed data transmissions.

Incidentally, when backbone 50 is comprised of microwave line, there are some cases that have difficulty in securing the high capacity, such as 52 Mbps, bandwidth W0 (First bandwidth) in all sections with a single wireless line.

Then, in those sections, for example, the section between backbone repeater 30(A) and backbone repeater 30(B), it is possible to connect by setting the wireless repeater 20(B), the wireless repeater 10(C) and the wireless line 40 that consists of a bundle of microwave lines 40a of relatively narrow, such as 6 Mbps, bandwidth W1 (Second bandwidth). The microwave lines 40a are comprised of a plurality of wireless devices 11 and a plurality of wireless devices 21, which are under the wireless repeater 20(B) and the wireless repeater 10 (C), respectively.

Wireless repeater 10 includes a plurality of wireless devices 11, wireless device interface unit 12 (wireless communication means) that controls each of the wireless devices 11, and control unit 15 that includes bandwidth converter unit 13 and communication module 14. Hereinafter, the word "interface" will be abbreviated as "IF" or "I/F".

Similarly, the counterpart of wireless repeater 10, wireless repeater 20, is comprised of control unit 15 that includes a plurality of wireless devices 21, wireless device I/F unit 12 (wireless communication means) that controls each of the wireless device 11, bandwidth converter unit 13 and communication module 14.

By individual pairs of wireless devices 11 and wireless devices 21, microwave line 40a with a capacity of bandwidth W1 (6 Mbps), for example, is generated, and wireless line 40 is made up of a bundle of these microwave lines 40a. Wireless frequency used in the microwave line 40a is, for example, 6.5 GHz, 7.5 GHz and 12 GHz.

Wireless device I/F units 12 in each of wireless repeater 10 and wireless repeater 20 are comprised of I/F card 12-1 (wireless communication means) described later, and control wireless device 11 and wireless device 21, connected to each of the repeaters. I/F card 12-1 can be inserted or removed separately in wireless repeater 10 and 20, and depending on the increase or decrease in the number of this I/F card, the number of microwave line 40a connecting between each of wireless device 11 and wireless device 21, which are under the wireless repeater 10 and 20 respectively, can be increased or decreased.

Similarly, bandwidth converter unit 13 performs the process of dividing the broad bandwidth of backbone 50 into the number of microwave lines 40a with a narrow bandwidth, and conversely, multiplexing each band of microwave line 40a to one band.

Communication module 14 similarly converts communication data into optical signals for the optical fiber communication that consists of backbone 50. In addition, when backbone 50 is high-capacity microwave line, communication module 14 converts the data into signals for the microwave communication.

Backbone repeater 30 comprises control unit 31 that controls the whole, intermediary process unit 32 that controls data exchange between connected local area network 60 and backbone 50, bandwidth converter units 33 and 34 that convert band, and communication modules 35 and 36 that control the sending and receiving of signals between media (such as optical fiber and microwave line) of backbone 50.

Each of bandwidth converter unit 33 and 34 has function of bandwidth conversion such as W1×N→W0(multiplexing) and W0→W1×N(division), and intermediary process unit 32 that locates between these two units performs intermediary processing in the unit of bandwidth W1.

Communication data 51 transmitted from backbone repeater 30(A) to wireless repeater 20(B) in the bandwidth W0 (52 Mbps, for example), as FIG. 3 exemplifies, is divided into the number (N) of microwave line 40a of bandwidth W1 (6 Mbps, for example) connecting between the pairs of wireless device 21 and 11, and becomes a plurality of communication data 41. The communication data 41 are transmitted through each microwave line 40a (wireless line 40). The receiving wireless repeater 10(C) makes communication data 51 in bandwidth W0 by multiplexing a plurality of communication data 41 in bandwidth W1, and transmits the communication data 51 to backbone repeater 30(D).

That is, backbone repeater 30 is a repeater that extracts data in bandwidth W1 (6 Mbps) unit from bandwidth W0 of backbone 50 by bandwidth conversion in bandwidth converter unit 33 and 34, and connects in the bandwidth of W1 (6 Mbps)×N=W0. And wireless repeater 20(B) and wireless repeater 10(C) have a function of dividing line bandwidth of W0=(6 Mbps)×N into W1 (6 Mbps) bandwidth and delivering the data to wireless device 21 or wireless device 11, and also multiplexing the data in W1 (6 Mbps) unit, coming from the wireless device 21 or wireless device 11 to the data in W0.

In such wireless repeater 10 and wireless repeater 20, the following is the example of automatic change in capacity of wireless line 40 in increasing and decreasing in the number of pairs of wireless devices 11 and wireless devices 21.

Figure 4:
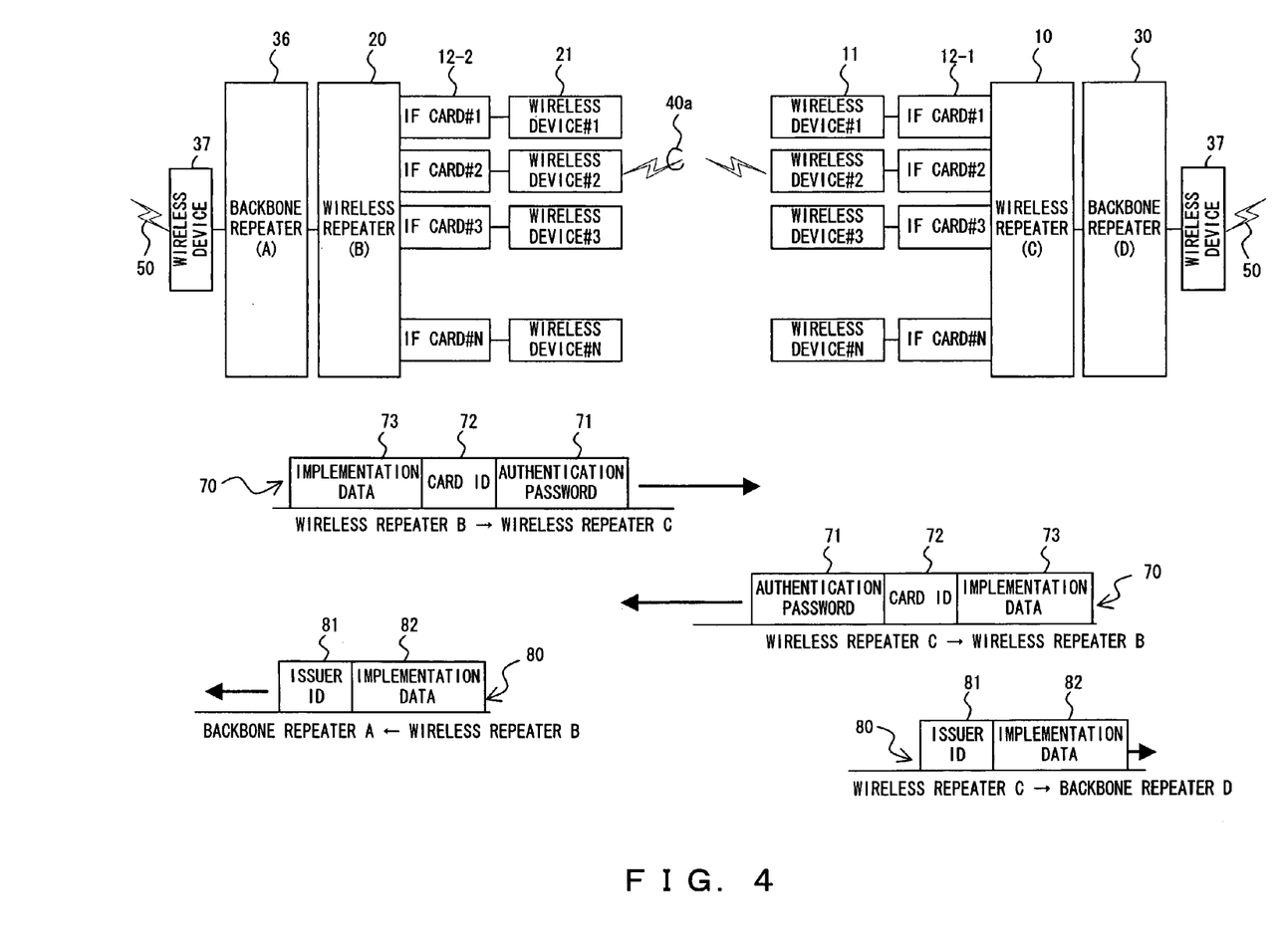
FIG. 4 is a block chart emphasizing on the part of wireless device and I/F card of I/F unit of the wireless device described in FIG. 1.

FIG. 4 is a block diagram emphasizing on the part of wireless device 11 and 21, and of I/F card 12-1 and I/F card 12-2 (wireless communication means) in wireless device I/F unit 12 described in FIG. 1. In this example in FIG. 4, backbone 50 connected to backbone repeater 30 is, instead of optical fiber, a high-capacity microwave line with a single wireless device 37.

Figure 5:
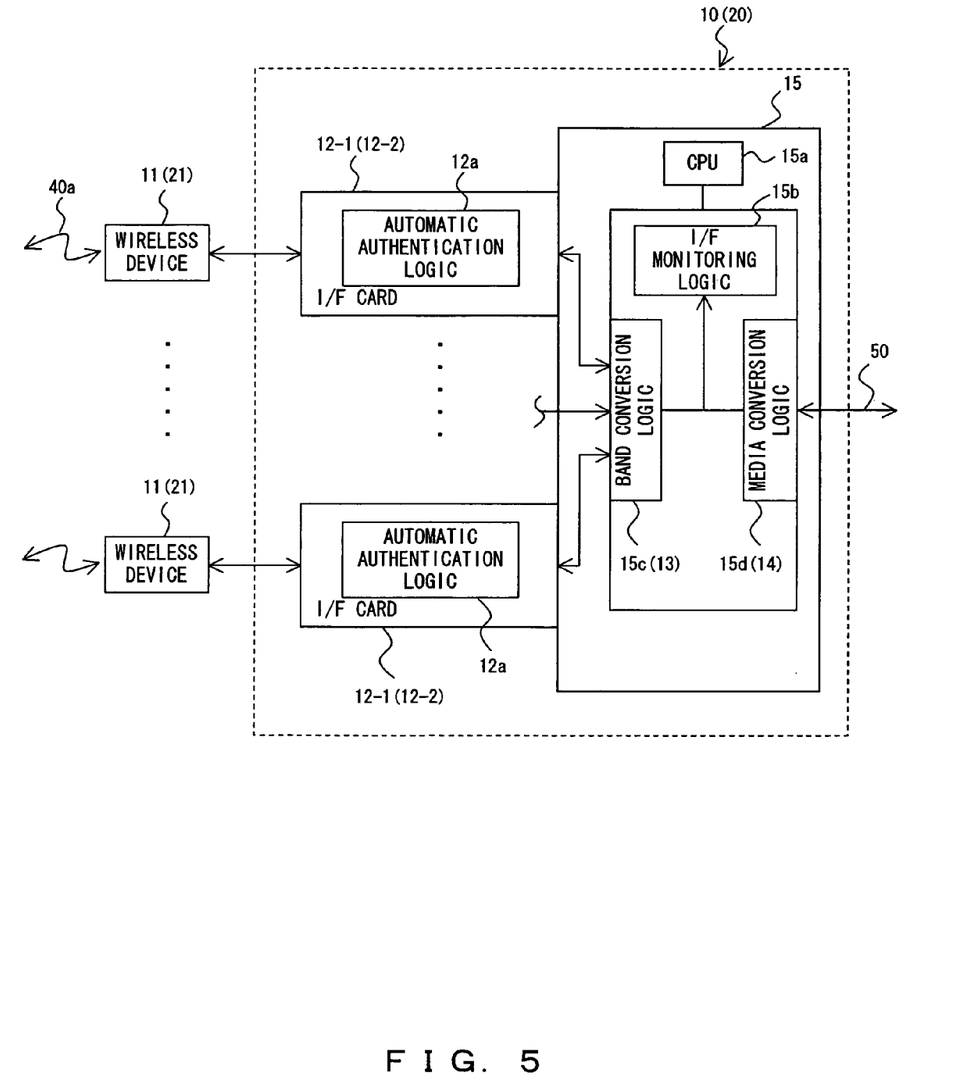
FIG. 5 is a schematic diagram describing a sample of detailed configuration inside the repeater as an embodiment of the present invention.

FIG. 5 is a schematic diagram showing an example of detailed configuration of control units 15 equipped in wireless repeater 10 and wireless repeater 20, and I/F card 12-1 and I/F card 12-2. As to the parts corresponding to the parts in FIG. 1, the corresponding number is written in the parenthesis.

The above-mentioned control unit 15 is equipped in each of wireless repeater 10 and wireless repeater 20 consists of CPU 15a that controls the whole, I/F monitoring logic 15b that monitors the operation status of I/F card 12-1 and I/F card 12-2, bandwidth conversion logic 15c that realizes bandwidth converter unit 13, and media conversion logic 15d that realizes communication module 14. Except for the CPU 15a, these parts are realized by hardware which comprises logic lines such as FPGA (Field Programmable Gate Array).

Also, in I/F card 12-1 and I/F card 12-2, there is automatic authentication logic 12a (authentication tool) to realize automatic authentication between wireless device 11 and wireless device 21. This automatic authentication logic 12a is equipped as a part of logic line that executes the whole function of I/F card 12-1 and I/F card 12-2, and is realized in FPGA, for example.

And between wireless device 11 and wireless device 21, that is, between I/F card 12-1 and I/F card 12-2 automatic authentication is performed with each other by exchanging authentication control frame 70.

Figure 6:
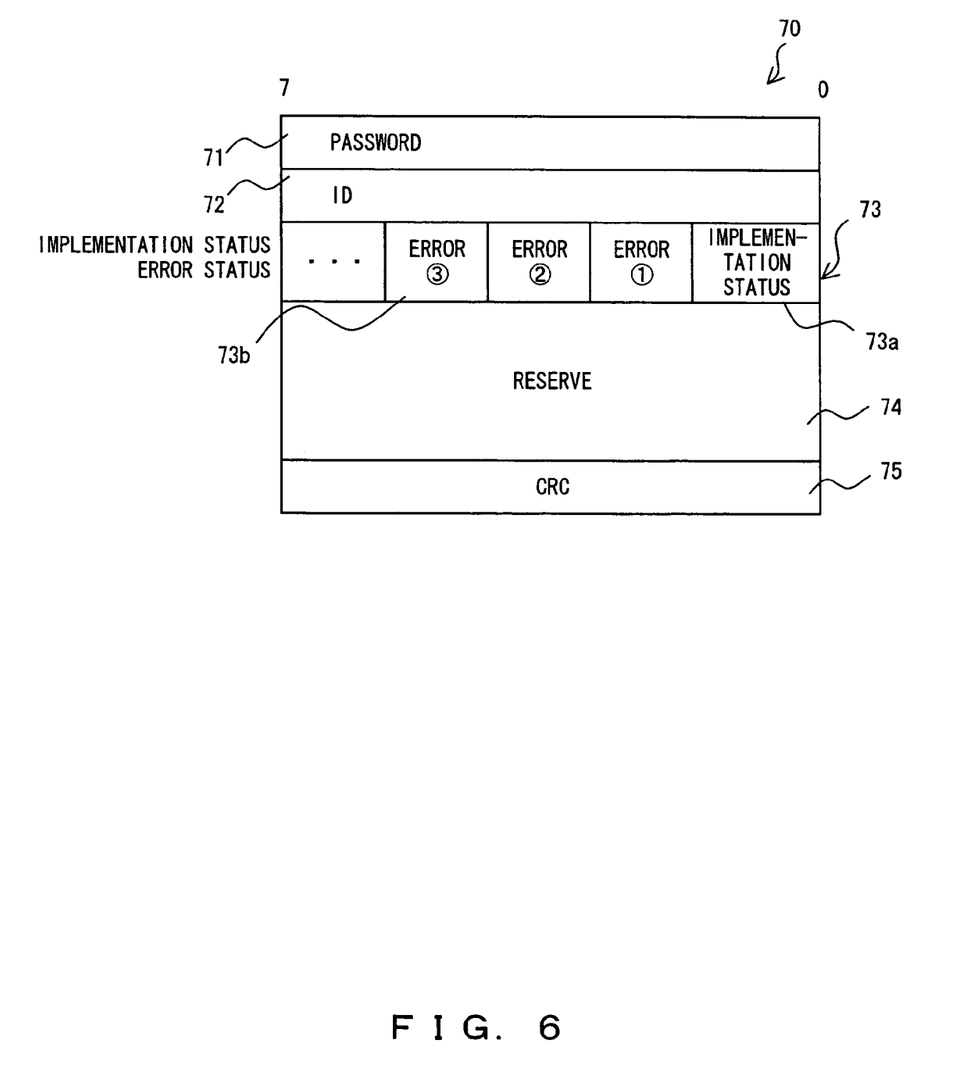
FIG. 6 is a schematic diagram showing an example of the configuration of authentication control frame used in the data communication system that is an embodiment of the present invention.

FIG. 6 is a schematic diagram showing an example of structure of this authentication control frame 70. The authentication control frame 70 includes authentication password 71, card ID 72, implementation data 73, reserved domain 74, and error check code 75. In addition, implementation data 73 includes implementation status flag 73a and implementation error data 73b.

In wireless repeater 10, the number of I/F card 12-1 and the equivalent wireless device 11 is N, #1 through #N. Equally, in wireless repeater 20, the number of I/F cards 12-2 and the equivalent wireless device 21 is N, #1 through #N. And as it is explained above, each of wireless device 11 of #1 through #N pairs with wireless device 21 of the same numbering, and comprises microwave line 40a of bandwidth W1 (6 Mbps, for example). Incidentally, wireless device 37 comprises backbone 50 with bandwidth of W1 (6 Mbps)×N=W0.

When the power supply is provided to wireless repeater 20 and wireless repeater 10, I/F card 12-2 (#1 through #N) communicates with the corresponding counterpart I/F card 12-1 (#1 through #N), and authenticates each other. At that time, using authentication control frame 70, the authentication control frame 70 for auto-negotiation is identified by authentication password 71, the card numbers are identified to each other by card ID 72, the data of implementation status and the data of whether or not the communication status is practical without error are exchanged by implementation data 73.

As a result of authentication, when the communication status is judged as practical, using authentication result delivery frame 80, the data of how many Ns the band is divided or multiplexed is delivered to backbone repeater 30. The authentication result delivery frame 80 consists of issuer ID 81 and implementation data 82. In implementation data 82, the values of the above-mentioned N and W1 are carried.

Backbone repeater 30 delivers this authentication result delivery frame 80 to all backbone repeaters 30 lying on backbone 50, and the whole line of backbone 50 is established with the same bandwidth W0 (=W1×N).

Figure 7:
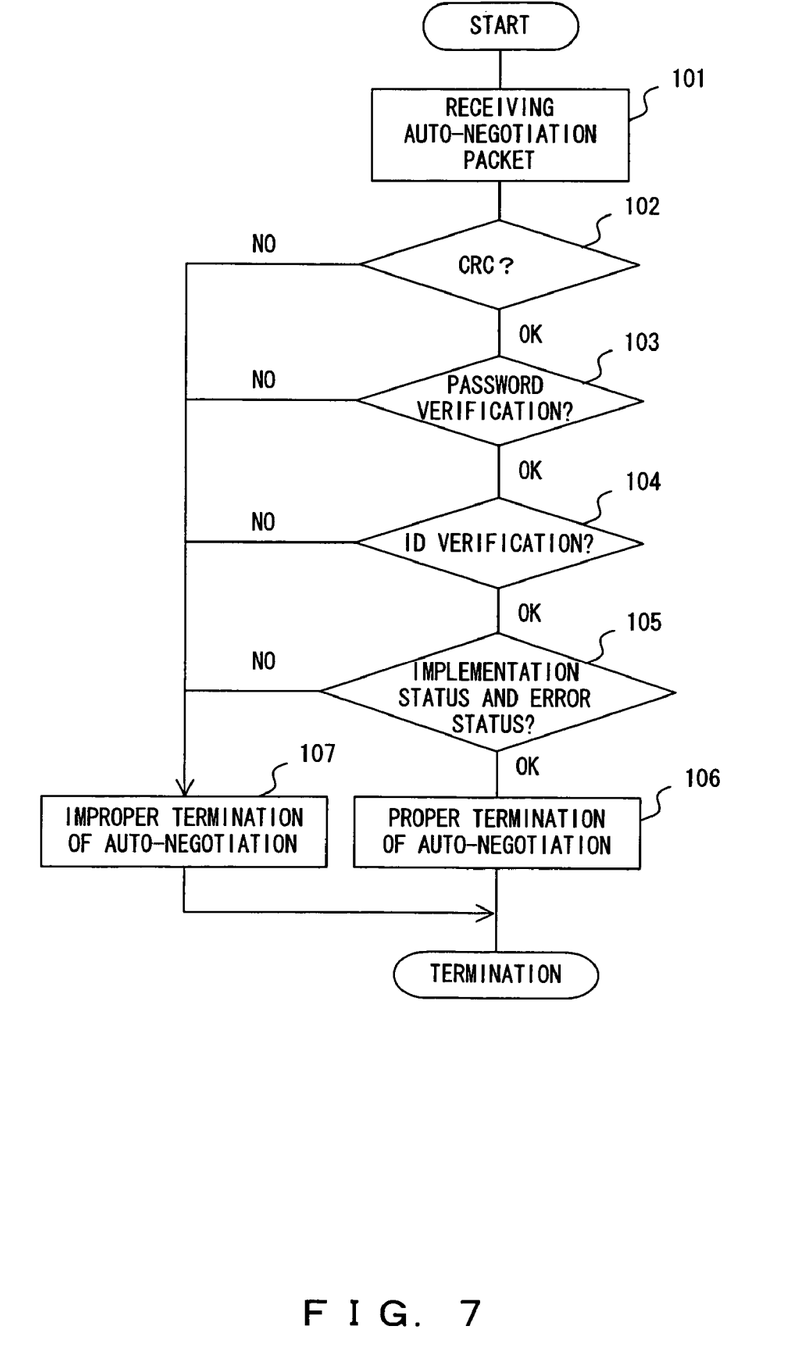
FIG. 7 is a flowchart describing an example of an authentication course using authentication control frame.

FIG. 7 is a flowchart indicating an example of the authentication process. automatic authentication logic 12a of I/F card 12-1 and I/F card of 12-2 receives authentication control frame 70 (step 101), checks the error check code 75 (step 102), in case of no errors, checks on the authentication password 71 (step 103). When the password is correct, it checks on the card ID 72 (step 104), and when the card ID matches, it checks implementation status, the status of error in the counterpart's I/F card by referring to implementation status flag 73a and implementation error data 73b in implementation data 73 (step 105), and when the result of step 105 is 'OK', automatic authentication goes to a proper termination (step 106).

When any of the above-explained checking steps has error, automatic authentication fails (step 107) and goes to improper termination. And microwave line 40a of the pair of I/F card 12-1 (wireless device 11) and I/F card 12-1 (wireless device 21) will not be used.

These authentication results are recognized in I/F monitoring logic 15b, the number of the usable I/F cards is determined, and the result is delivered to all backbone repeaters 30 carried in authentication result delivery frame 80.

Control unit 31 of backbone repeater 30 receives the authentication result delivery frame 80, input the above-mentioned N value in bandwidth converter unit 33 and bandwidth converter unit 34, and changes the performance of band dividing and multiplexing in the bandwidth converter unit 33 and bandwidth converter unit 34 according to the above-mentioned N value.

In this manner, in starting up wireless repeater 10 and wireless repeater 20 starting of data communication system including wireless repeater 10 and wireless repeater 20 become possible without the need of operator intervention by the automatic recognition of the number of the usable microwave line which consists of wireless line 40 and by delivering of the N value to all backbone repeaters 30 with authentication result delivery frame 80.

Figure 8:
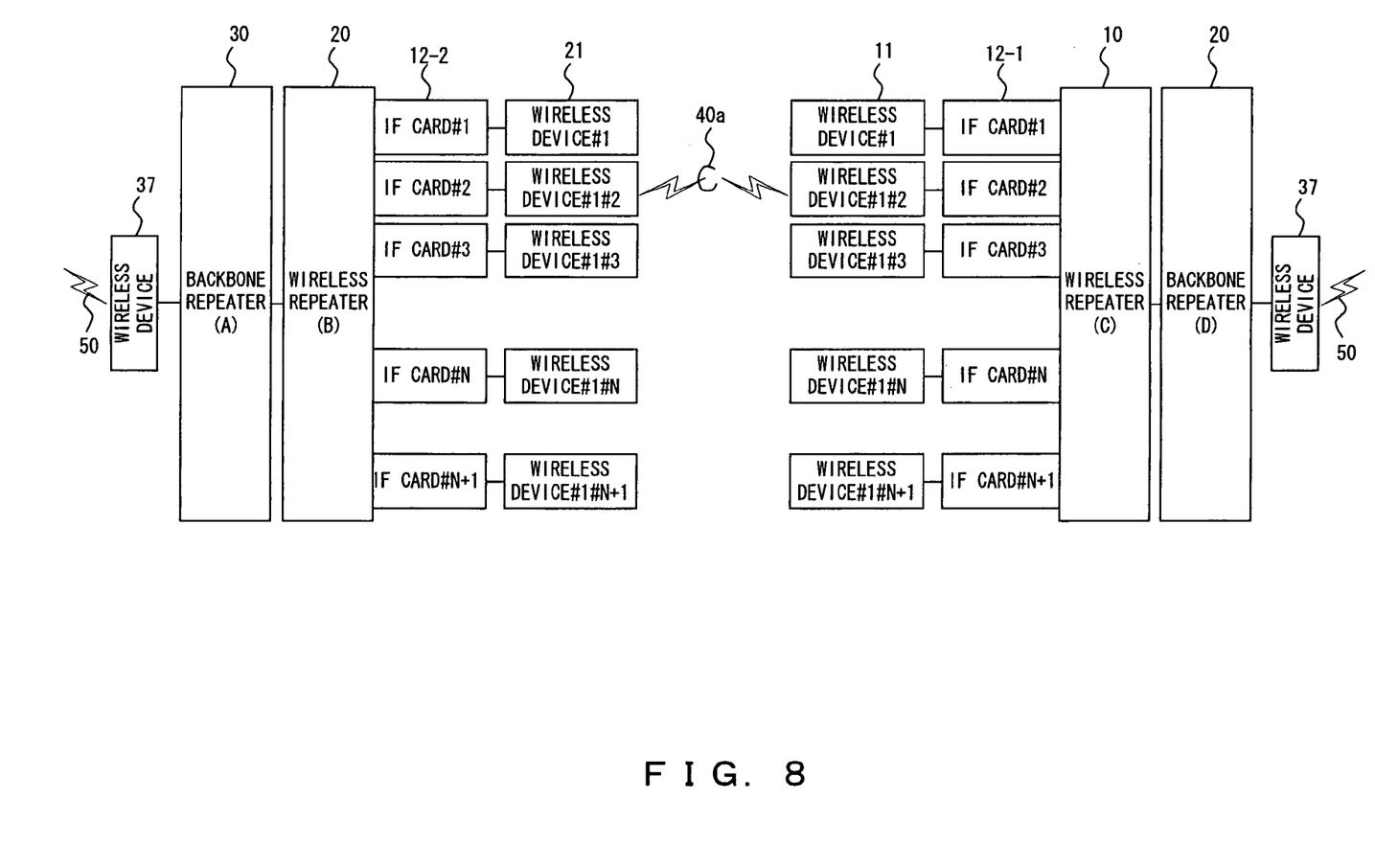
FIG. 8 is a block diagram describing an example of operation in increasing bandwidth W0 in data communication system that is an embodiment of the present invention.

By referring to FIG. 8, the following is the explanation of the increase in the number (N) of microwave lines 40*a* that consists of wireless line 40 by adding a pair of I/F card 12-1 (wireless device 11) and I/F card 12-2 (wireless device 21) when bandwidth W0 is needed to be increased during its operation in the data communication system of the present embodiment.

In this case, IF cards (#N+1) are inserted to both wireless repeater 10 and wireless repeater 20 during the operation, and connect to added wireless device (#N+1).

On connecting to wireless device, the added I/F cards starts the automatic authentication as it is explained above. As a result of automatic authentication, when the line is judged as practical status for communication, I/F monitoring logic 15*b* delivers the new dividing/multiplexing value N in authentication result delivery frame 80 to backbone repeater 30 (A,D). After the data went to all the backbone repeaters 30 control unit 31 of the individual backbone repeater 30 can increase the bandwidth W0 of backbone 50 all at once by giving commands to bandwidth converter unit 33 and bandwidth converter unit 34 and by switching the dividing/multiplexing of band of the individual backbone repeater 30.

In such way, the band of added microwave line 40*a* can be added to and increase the bandwidth W0 of backbone 50 in operation without affecting the currently operating microwave line 40*a*.

Figure 9:
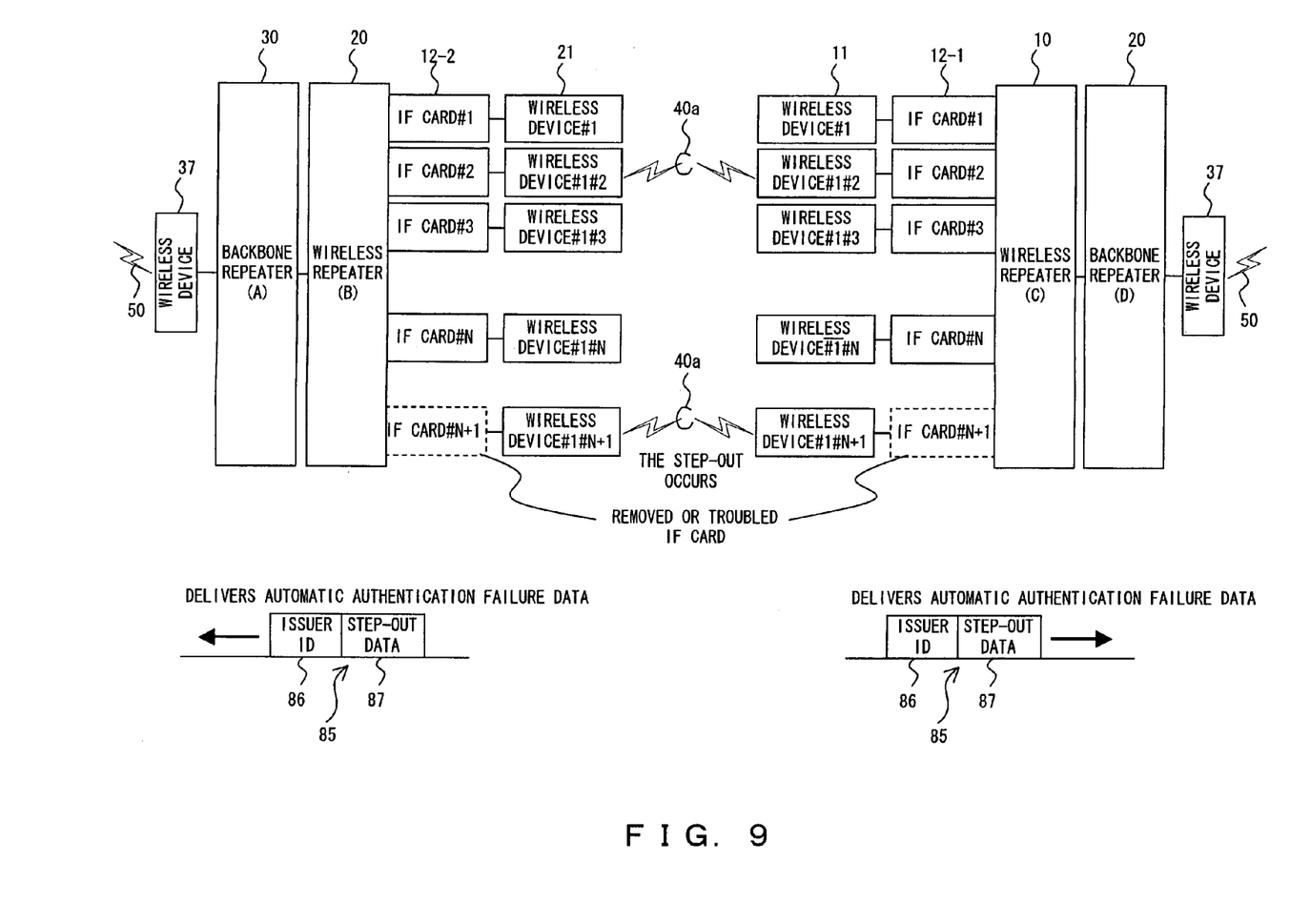
FIG. 9 is a block diagram describing an example of operation in decreasing bandwidth W0 in data communication system that is an embodiment of the present invention.

Next, by referring to FIG. 9, the following is given to explain the case of automatically reducing the bandwidth W0 for backbone 50 when the operating microwave line 40*a* is lost due to the error in a divided band (microwave line 40*a*) or due to the maintenance operation such as removal of IF card in reducing the band.

That is, when communication is disconnected in an operating IF card of a band, for any cause, the step-out occurs between IF cards.

In FIG. 9, for example, when the error occurs or when the removal operation of IF card is conducted in card of IF card N+1, the step-out occurs between reciprocal IF cards, I/F monitoring logic 15*b* detecting this step-out delivers the step-out data frame 85 to adjacent backbone repeater 30, the step-out data frame 85 includes the step-out data 87 that indicates the point of the step-out, that is which microwave lines 40*a* is lost among a plurality of microwave line 40*a* that consist of wireless line 40 and issuer ID 86. This step-out data frame 85 is delivered to every backbone repeater 30 via backbone repeater 30, and then control unit 31 of backbone repeater 30 gives a command to bandwidth converter unit 33 and bandwidth converter unit 34 to reduce the bandwidth W0 of the whole backbone 50 all at once. As a result, the bandwidth of backbone 50 is automatically reduced during operation.

Figure 10:
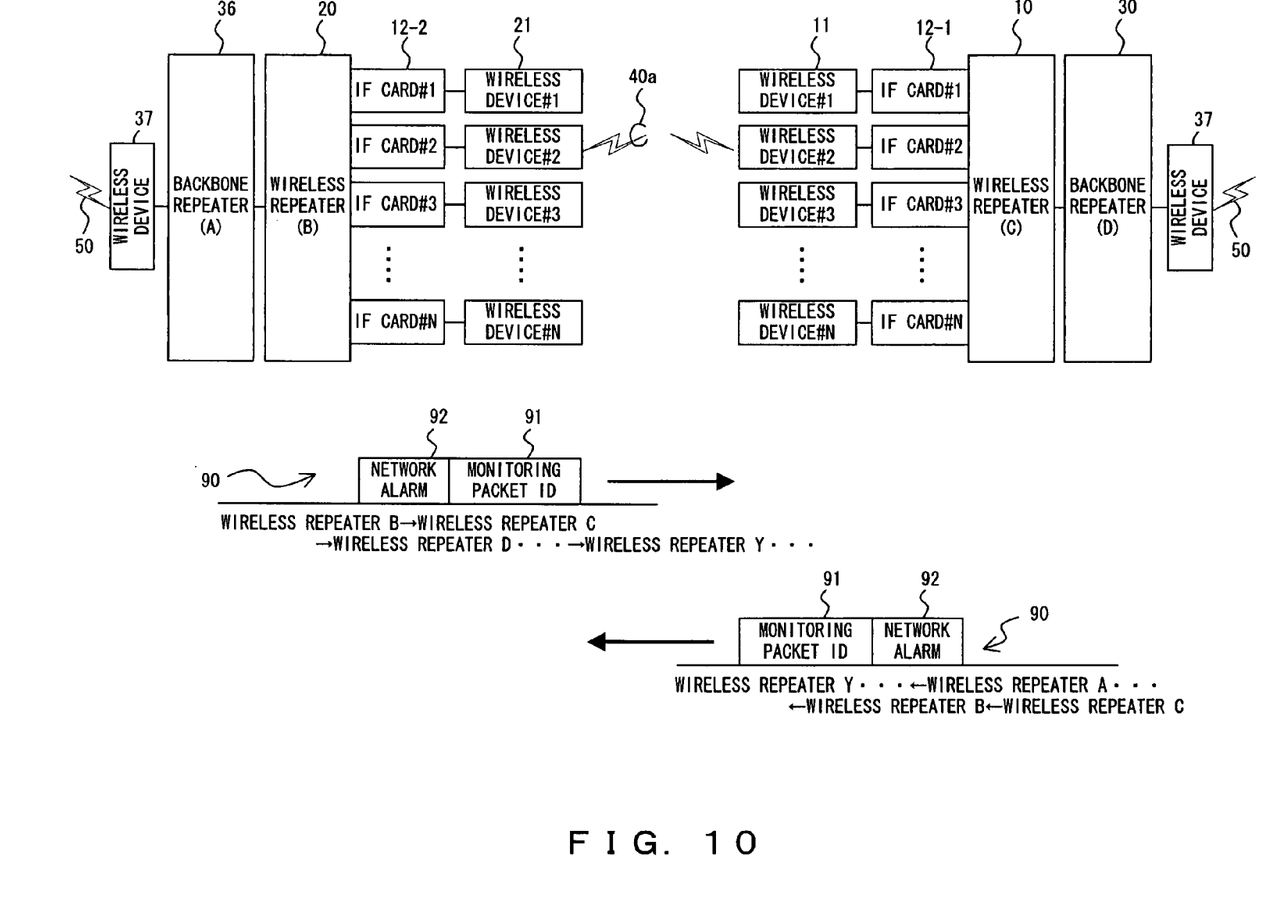
FIG. 10 is a block diagram explaining an example of a variety of repeater that is an embodiment of the present invention.
Figure 11:
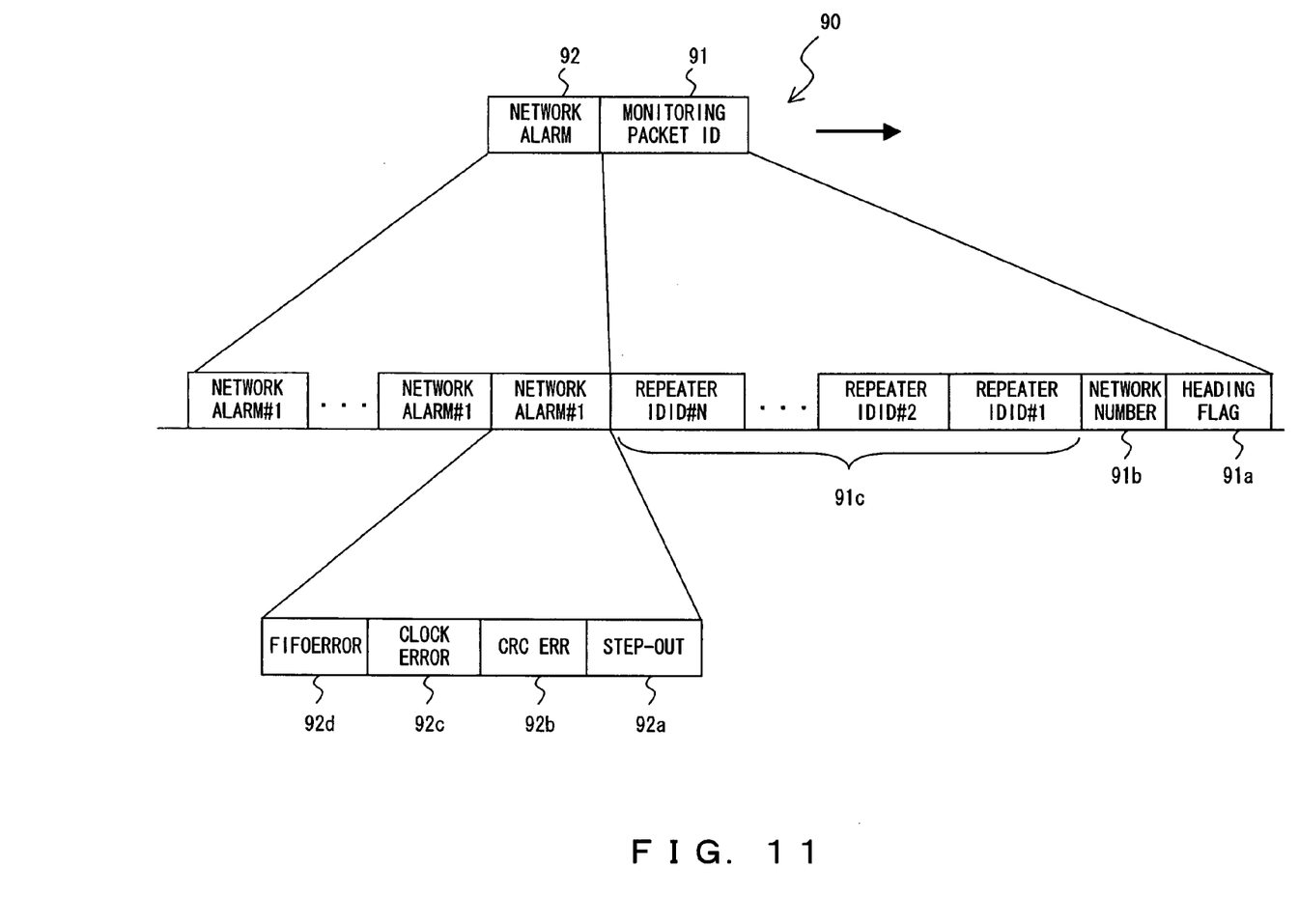
FIG. 11 is a schematic diagram showing the detailed configuration of monitoring packet with a regular circulation in the data communication system that is an embodiment of the present invention.

Next, by referring to FIG. 10 and FIG. 11, the explanation of a variation of the present embodiment is given. This variation has the system that monitors a data communication system by circulating monitoring packets 90 in every band in bandwidth W1 that corresponds to microwave line 40*a* in backbone 50.

In other words, monitoring packets 90 circulated regularly in the bandwidth W1 in the unit of each microwave line 40*a*, this regular circulation monitoring packets 90 is used in each microwave line 40*a* that is a component of backbone 50. Monitoring packets 90 consists of monitoring packet ID 91 and network alarm 92.

Control unit 31 in the individual backbone repeater 30 extracts the monitoring packet 90, and monitors the data of network alarm 92 included in a monitoring packet 90.

If there is no error in the data of this network alarm 92, the line continues the regular operation, and if there is an error in the data of this network alarm 92, it is an evidence that the communication error occurred somewhere in the line that the network alarm 92 is circulating, and the band is closed. In other words, the number of the band with error is reduced.

This reduction operation is conducted to every backbone repeater 30, and dividing and multiplexing numbers are automatically changed. In this manner, communication of the whole system is maintained.

FIG. 11 is a schematic diagram showing an example of the detailed configuration of a monitoring packet 90 that circulates regularly in microwave line 40*a*. As this FIG. 11 exemplifies, monitoring packets 90 consist of monitoring packet ID 91 and network alarm 92.

On the monitoring packet ID 91, heading flag 91*a* that identifies as regular circulation packet is attached. Also, to identify which line (for example, #1~#N corresponding the number of microwave line 40*a*) the packet is circulating, network number 91*b* is given.

Network alarm 92 comprises each alarming data of the step-out error 92*a* that corresponds to each repeater ID, CRC error 92*b*, clock error 92*c*, and FIFO error 92*d*.

If connection error occurs in any line of backbone repeater 30, wireless repeater 20 and wireless repeater 10, any of the network alarms will show the error, and by extracting the error of network alarm by each repeater, the line that has the error is specified.

With the error detection by this monitoring packet 90, automatic increase and decrease of line, explained above, becomes possible.

As it is fully explained above, according to the present embodiment, it is possible to change the band automatically without the artificial operation when changes (increase and decrease) are made in line band.

That is, in case of errors in data communication network, and increase and decrease of band, auto-negotiation is performed by monitoring packets 90 among the wireless repeater 10, the wireless repeater 20 and the backbone repeater 30. According to the result, the system recognizes band that is connected for communication and performs dividing/multiplexing of connected band in all repeaters on the backbone 50.

As a result, the immediate control of data communication network, which has highly flexible settings of bandwidth W0 in the backbone 50 and bandwidth W1 in the wireless line 40, and the immediate control of data communication network, which can respond to the change in bandwidth W1 during operation are realized.

Accordingly, RPR that requires prompt error recovery can be adopted in the adapt communication system of the present embodiment.

Incidentally, the configuration and titles of each data that consist of authentication control frame 70, authentication result delivery frame 80, the step-out data frame 85, monitoring packet 90, which are described above, are just an example. Therefore, when RPR etc. is used as communication standard of the backbone 50, for example, control frames etc. that are prescribed by the RPR can be used suitably and can perform the function of these frames and packets.

In addition, it is needless to say that the embodiment of the present invention is not limited to the examples described above, and can be changed in various ways within its object.

According to the present invention, without the operator intervention, prompt control of band distribution following the increase and the decrease of wireless communication media that makes a wireless line can be made. Also, the flexible increase and decrease of band, caused by increase and decrease of wireless communication media that makes a wireless line, allow greater flexibility of operation.

What is claimed is:

1. A wireless repeater between first and second apparatuses communicating in a first bandwidth, including:
    a communication module for communicating with the first apparatus through a first communication line of the first bandwidth;
    a plurality of wireless communication units, each for communicating with the second apparatus through each of a bundle of second communication lines, where each second communication line is a wireless communication line of a second bandwidth and the bundle of second communication lines has the first bandwidth; and
    a band control unit for
        automatically recognizing one or more of the wireless communication units that are added during operation, or the wireless communication unit that is lost during operation,
        as a result of the recognizing, dynamically determining a number N of usable wireless communication units, and
        dynamically increasing or decreasing the capacity of the first bandwidth of the first communication line according to increase or decrease in the determined number N of the usable wireless communication units, through dividing data in the first bandwidth into the determined number N of the second bandwidths, and through N-fold-multiplexing data in the second bandwidths into the first bandwidth.

2. The wireless repeater according to claim 1, wherein each wireless communication unit includes an authentication tool that automatically authenticates the counterpart of the wireless communication unit which sends and receives the data at the second apparatus, and
    the band control unit starts up the connecting action through the first communication line and the bundle of second communication lines by starting the wireless communication unit that is authenticated.

3. The wireless repeater according to claim 1, wherein said first communication line and said bundle of the second communication lines are at least a part of a multiplexed ring topology transmission route, and
    a monitoring packet that circulates the ring topology transmission route via individual wireless communication unit enables monitoring the establishment of the connection of the individual second bandwidths with the individual wireless communication units.

4. A method for wireless repeating between first and second apparatuses communicating in a first bandwidth, including:
    communicating with the first apparatus through a first communication line of the first bandwidth;
    communicating with the second apparatus through a bundle of second communication lines, where each second communication line is a wireless communication line of a second bandwidth and the bundle of second communication lines has the first bandwidth;
    automatically recognizing that a new wireless communication line of the second bandwidth is added as a new second communication line, or that a part of the bundle of second communication lines becomes non-usable,
    as a result of the recognizing, dynamically determining a number N of usable second communication lines; and
    dynamically increasing or decreasing the capacity of the first bandwidth of the first communication line according to increase or decrease in the determined number N, through dividing data in the first bandwidth into the determined number N of the second bandwidths, and through N-fold-multiplexing data in the second bandwidths into the first bandwidth.

5. The method according to claim 4, wherein
    a pair of wireless devices connected by the individual second communication line automatically authenticate each other, and
    when the practical status for communication of all the second communication lines is confirmed, the data communication is started utilizing the first bandwidth of the first communication line and the bundle of second communication lines.

6. The method according to claim 4, wherein the capacity of the first bandwidth of the existing bundle of the second communication lines is increased in the unit of the second bandwidth when a pair of wireless devices at both ends of the new second communication line automatically authenticate each other and the practical status for communication is confirmed.

7. The method according to claim 4, wherein
    said first communication line and said bundle of second communication lines is at least a part of ring topology transmission route, and
    by circulating a monitoring packet for connection monitoring regularly in said every individual second communication line, the increase or the decrease of the second communication lines is monitored, and the first bandwidth of the operating first communication line and the operating bundle of second communication lines is changed according to the increase or the decrease of the second communication lines.

8. A data communication system that includes:
    a plurality of data relay devices communicating with each other through at least a part of ring topology transmission route including a first communication line of a first bandwidth, where each data relay device controls the sending and receiving of the data between the first communication line and a network connected to the data relay device; and
    wireless repeaters existing between the data relay devices;
    wherein each of said wireless repeaters includes:
    a communication module for communicating with one of the plurality of data relay devices in the first bandwidth;
    a plurality of wireless communication units, each for communicating with another wireless communication unit in another wireless repeater through each of a bundle of second communication lines, where each second communication line is a wireless communication line of a second bandwidth and the bundle of second communication lines implements a part of the ring topology transmission route of the first bandwidth; and
    a band control unit for
        automatically recognizing one or more of the wireless communication units that are added during operation, or the wireless communication unit that is lost during operation,
        as a result of the recognizing, dynamically determining a number N of usable wireless communication units; and
        dynamically increasing or decreasing the capacity of the first bandwidth of the first communication line according to increase or decrease in the determined number N of the usable wireless communication units, through dividing data in the first bandwidth into the determined number N of the second bandwidths, and through N-fold-multiplexing data in the second bandwidths into the first bandwidth.

9. The data communication system according to claim 8, wherein said individual wireless communication unit of the wireless repeater includes an authentication tool that automatically authenticates the other side of wireless communication unit which sends and receives the data, and the band control unit starts up the authenticated wireless communication unit and begins the connecting action through the first communication line and the bundle of second communication lines.

10. The data communication system according to claim 8, wherein said data relay device monitors the establishment of connection of individual of the second bandwidth by the individual wireless communication unit with a monitoring packet circulating the ring topology transmission route via the individual wireless communication unit, and said data relay device includes the function to follow the changes in the capacity of the first bandwidth caused by the increase or the decrease of the wireless communication unit.

* * * * *